INVENTORS:
Erwin Marx
Herbert Budewart

INVENTORS:
Erwin Marx
Herbert Buchwald.

Patented Aug. 30, 1938

2,128,884

UNITED STATES PATENT OFFICE 2,128,884

ARC CONVERTER

Erwin Marx, Brunswick, and Herbert Buchwald, Berlin-Reinickendorf, Germany

Application October 22, 1935, Serial No. 46,202
In Germany October 25, 1934

27 Claims. (Cl. 250—27.5)

Our invention relates to certain new and useful improvements in arc converters, i. e., arc rectifiers, arc inverters, devices for frequency conversion described in the book of the inventor Professor Erwin Marx and titled "Lichtbogenstromrichter" published in Berlin in 1932 and where the arc is periodically initiated by an auxiliary arc and periodically extinguished in a flow of air and/or gas and/or steam, such arc converters being called "Marx-Stromrichter" in Germany.

An object of our invention is to provide means for introducing into the arc gap, i. e., the space between those parts of the electrodes between which the arc plays, a continuous flow of air and/or gas and/or steam wholly or partially through one electrode between the main electrode and the screen electrode. The said flow of air and/or gas and/or steam will be called in the following description the axial flow. While the arc is burning, the said axial flow streams along the arc and surrounds the arc on its entire length, in order to prevent accumulation of arc products in the space between the electrodes. After the current feeding the arc has passed through zero and the arc has been extinguished the flow of air and/or gas and/or steam must be adequate to ensure the scavenging of the arc gas from the arc residues remaining behind and facilitating back-firing of the converting arrangement.

Another object of our invention is to provide means for discharging the air and/or gas and/or steam wholly or partially through the other electrode between the main electrode and the screen electrode.

For introducing into the arc gap and discharging the said current of air and/or gas and/or steam we propose ducts of annular cross section formed by two or more adjoining parts of electrodes. By this way the current of air and/or gas and/or steam passing through the arc gap forms a hollow cylinder surrounding the arc burning between the electrodes.

A further object is to provide parts of electrodes suitably shaped between which and/or along which the current of air and/or gas and/or steam is guided with more or less high velocity. Any sharp bend and any immediate alteration of the cross section of the gas flow at points of high velocity may cause eddies and impingement along the way of the gas current, which may produce bad effects on the working conditions of the converting arrangement.

A further object of our invention is to start the auxiliary arc between the main electrode and the screen electrode, whereby the auxiliary arc is driven to the opposing main electrode by the current of air and/or gas and/or steam introduced into the arc gap through the said main electrode and screen electrode.

A still further object of our invention is to introduce into the arc gap the current of air and/or steam partially in radial direction flowing between the opposing surfaces of the two screen electrodes. The use of the said gas flow—called briefly radially inward gas flow in the following description—is attended by the advantage of preventing the impingement of the gas against the surface of the opposite screen electrode and/or any undue expansion of the arc along its path between the electrodes.

This additional flow of air and/or gas and/or steam may also be supplied through holes distributed over the surface adjacent to the arc gap of one or both screen electrodes or any annular opening in the one and/or the other screen electrode without departing from our invention. Further objects and advantages of our invention will become apparent as the description proceeds.

Our invention will be fully set forth in the following description referring to the accompanying drawings and the features of novelties which characterize our invention will be pointed out with particularity in the claims annexed to and forming a part of this specification.

Figure 1:
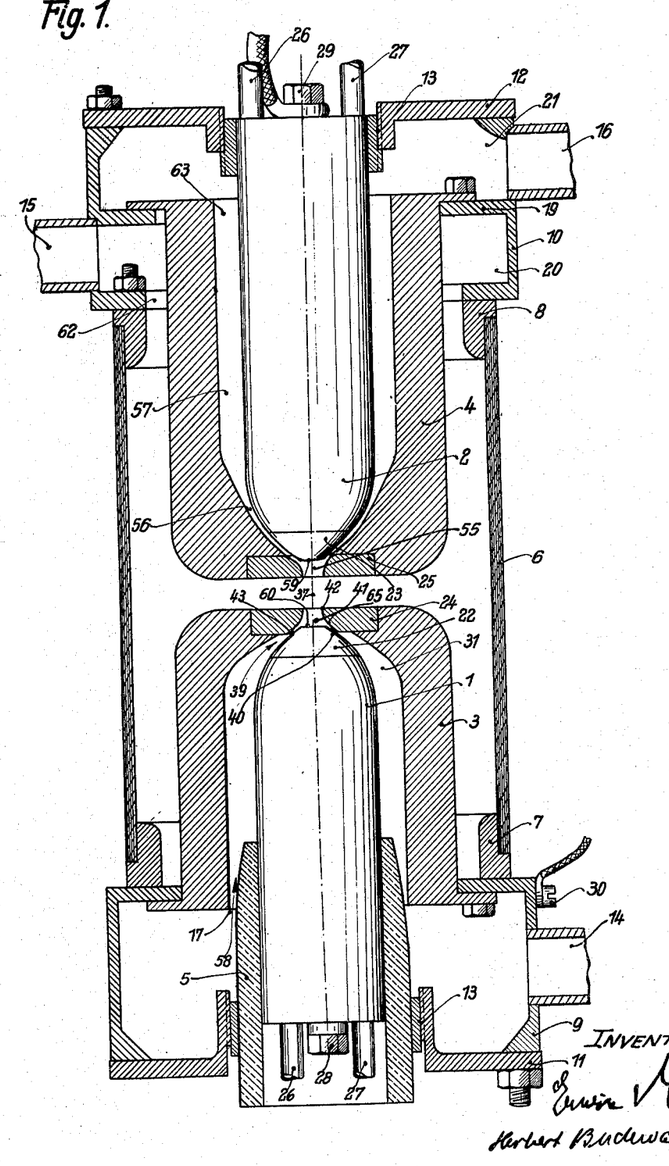
Fig. 1 is a sectional view relating to one form of execution of an arc converter embodying our invention and consisting of a couple of electrodes arranged in a chamber of pressed air and/or gas and/or steam.

In Fig. 1 the two main electrodes are formed by tubular bodies 1 and 2 which are arranged opposite to each other. Each main electrode is surrounded by a coaxial cylindrical body 3 or 4 respectively of suitable shape adapted for screening the main electrode from the electrostatic field and for guiding the flow of air and/or gas and/or steam properly to the arc gap 37 and for leading away from the arc gap the said flow in a suitable manner.

Since we propose to start the auxiliary arc between a main electrode and the adjoining screen electrode, it is necessary to insulate the said main electrode from the part of the screen electrode to which the igniting voltage may be applied. In the example shown in the drawings of Figure 1 the screen electrode is insulated from the main electrode by the cylinder 5 of bakelized paper or the like suitably fixed to the main electrode 1. In particular cases of working conditions it will be desirable, that both of the screen electrodes may be insulated from their respective main electrodes.

The converting chamber consists of a cylinder 6 of porcelain, bakelized paper or any insulating material of sufficient mechanical strength. Onto the two ends of the said cylinder metal rings 7 and 8 are attached to which the headers 9 and 10 are secured, forming chambers which serve for distribution and recollection of the air and/or gas and/or steam entering and leaving the converting chamber. Finally the whole chamber is shut against atmospheric pressure by the covers 11 and 12 into which the main electrodes are screwed by means of threads 13 attached to both the covers and the main electrodes.

The air and/or gas and/or steam enters the distribution chamber 9 through the supply duct 14 and leaves it through the annular space 17 in order to flow along the main electrode. The chamber 10 is divided into two parts 20 and 21 by a flat ring 19 fixed to the sidewall of the said chamber. Th duct 15 is the inlet for the radially inward flowing gas or steam, whilst 16 is the discharge duct for the gas recollected in the room 21.

A header 9 as described above, separated into two parts 20 and 21, may be used on both sides of the converting chamber for introducing the radially inward gas flow from either the top header or the bottom header or from both the headers without departing from our invention in its broader aspects.

Those parts of both the main electrodes and the screen electrodes upon which the foot points of the arcs will remain or which will be touched by the arcs may consist of particular inset pieces 22, 23, 24, 25. The said inset pieces are made of suitable metals or alloys apt to withstand excessive burning-off by the arcs, and are secured to the main parts of the electrodes in a suitable manner in order that they can be exchanged easily. In order to transport away the heat produced by the foot points of the arc a cooling medium, e. g., pressed gas, water or the like is supplied to the main electrodes through the ducts 26 and leaves the main electrodes through the ducts 27. The path of the said cooling medium inside the main electrodes is not shown in the drawings. The clamps 28 and 29 represent the line connection terminals of the converting circuit. The voltage for igniting the auxiliary arc is applied to the clamps 30 and 28.

Figure 2:
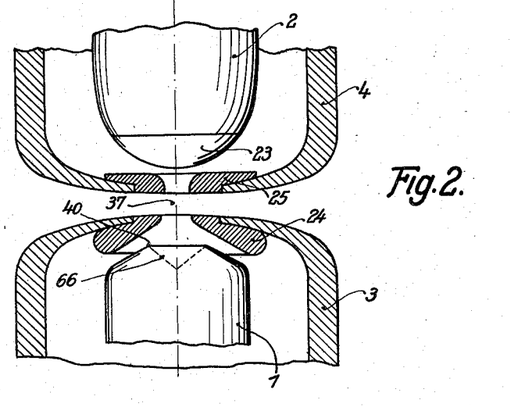
Figs. 2-4 relate to different forms of execution of the parts of electrodes between which the arc may be maintained and along which and/or between which the gas or steam current may have a very high velocity.
Figure 4:
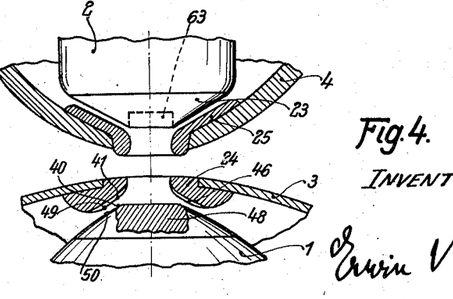

The inset pieces 22 and 23 of the main electrodes referred to above usually are of conical shape, but they may also reveal any form of curvature, if required, as the examples of Figs. 2 and 4 show.

The inset piece 24 of the screen electrode 3, which may serve at the same time as an auxiliary electrode in order to initiate the auxiliary arc is of annular shape surrounding the front portion of the main electrode, thus leaving only a small duct 43 between the auxiliary electrode and the main electrode. The auxiliary arc is started between two closely opposing points upon the said both parts of electrodes, e. g., at the points 40 and 41 in Fig. 1 or 44 and 45 in Fig. 3 and blown to the opposite electrode by the pressed gas arriving from the direction shown by the arrow 39. As it is apparent from the drawing of Fig. 1, Fig. 2 and Fig. 3 the passageway of the flow of air and/or gas and/or steam from point 31 to the arc gap 37 forms a narrow duct of annular shape and therefore the velocity of the said flow may increase along the said passageway. For this reason the said inset pieces of the screen electrode and/or of the main electrode must be suitably shaped for avoiding sharp bends of the gas flow and the formation of excessive eddies. The upper rim 42 in particular, of the central opening 65 of the screen electrode may be specially designed e. g., sharply edged for keeping the jet of the gas flow entering the arc gap concentrated.

The inset piece 25 of the screen electrode 4 referred to above is of annular shape surrounding the top portion of the main electrode 2 and the inset piece 23. As the gas current flows from the arc space between the said screen electrode and the main electrode to 57 at a considerably high velocity no immediate alteration of the cross section may take place in the conical duct 56 formed by the inset piece 25 of the screen electrode and the main electrode, i. e., the cross section of 56 will widen very gradually up to the cross section of 57.

Figure 5:
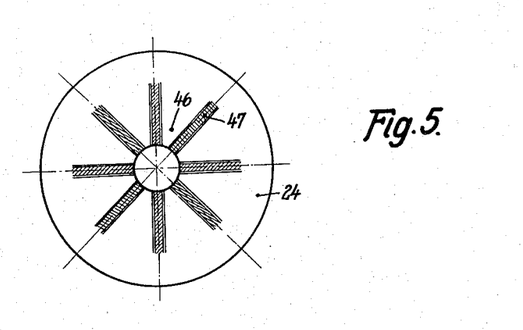
Fig. 5 shows a plane view of the ignition electrode as shown in Figure 4 seen in the direction from below.

In Figs. 4 and 5 channels 47 radially arranged are inserted into the auxiliary electrode into the surface opposite to the main electrode. By this means the area of the cross-section of the gas stream may be increased, whilst the distance of the points 41 and 40 between which the ignition of the auxiliary arc takes place remains small, the point 41 being disposed on the section 46 between two channels.

Furthermore in Fig. 4 an example is given showing that the burning-off of the main electrode by the main arc may increase to a considerable amount—as shown by the narrowly hatched area 48—without disturbing the gas stream and without preventing the regular ignition of the auxiliary arc. The points 41 and 42, between which, at the beginning, the igniting arc was started, have moved according to the amount of burning-away of the points 49 and 50.

Figure 6:
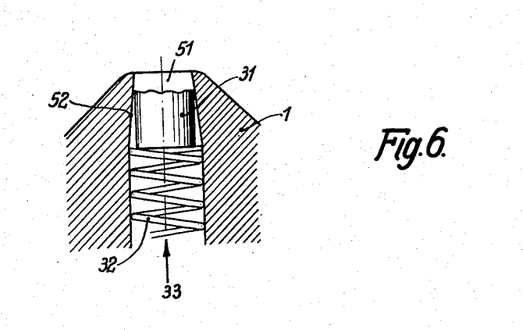
Figure 6 shows an example of execution of the part of the main electrode upon which the burning-off caused by foot points of the arc may take place, the adjoining screen electrode being omitted.

Another example dealing with the burning-off of the main electrode is shown in Fig. 6. The electrode 1 has at the top a taper bore 51. Against the wall 52 an inset piece 31 upon which the foot points of the arc may remain during the burning period is pressed by a spring 32.

Figure 7:
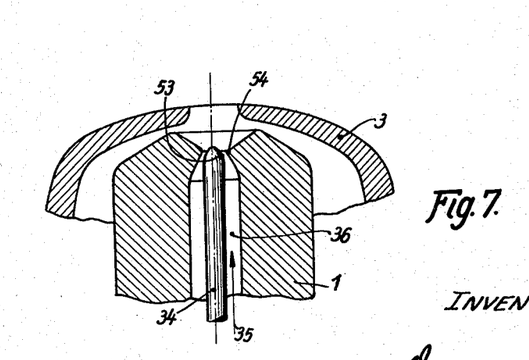
Figure 7 relates to another form of execution showing an electrode consisting of a screen electrode, a main electrode and a particular auxiliary electrode.

In Fig. 7 a third electrode 34, used as ignition electrode has been provided for. The main electrode 1 has a bore 36, into which the ignition electrode 34 is arranged suitably insulated against the main electrode. The auxiliary arc is started between 53 and 54, and is blown to the opposite electrode by the portion of the air and/or gas and/or steam streaming in the direction of the arrow 35 between the said main electrode and ignition electrode. In this case the screen electrode serves only to screen the main electrode from the electro-static field arising between the electrodes during the idle half period and must not necessarily be insulated against the main electrode.

The general principles of operation of an arc converter in accordance with our invention may be briefly summarized as follows:

The pressed air and/or gas and/or steam enters the distribution chamber 9 through the duct 14 and flows through the annular opening 17 between the screen electrode 3 and the main electrode 1 in the direction indicated by the arrow 58. Passing the annular narrow duct 43 in the direction indicated by the arrow 39 the gas flow enters the arc gap 37 through the central aperture 65 of the screen electrode 24. 56 forms an annular duct more or less conically arranged for discharging the gas flow streaming through the arc gap. In this case the current of air and/or gas and/or steam forms on its passageway through the arc gap a hollow cylinder of constant or varying diameter. Because of the small openings 55 and 65 of the screen electrodes which are necessary to ensure the screening of the hot main electrode heated by the foot points of the main arc the gas flow may obtain a high velocity on its passageway through the arc gap.

Preferably means are provided for avoiding the excessive formation of eddies of the current of air and/or gas and/or steam particularly in those parts of the passage of the said current having a high velocity. For this reason it is also advantageous that the said gas flow has in no parts of its passage through the converting chamber a greater velocity than on the part where it passes the arc gap, i. e., the actual space in which the arc is burning. It is obvious that the formation of eddies is associated with different draw-backs. For instance the formation of eddies in or near the arc gap may constitute regions in which an accumulation of heat and/or arc products may take place, thus facilitating back-firing between the electrodes. The formation of eddies also results in unduly increasing the pressure drop of the current of air and/or gas and/or steam across the converter chamber, thus reducing the overall efficiency of the converting arrangement. These advantages may be remedied by means including parts of electrodes suitably shaped which prevent impingement of the current of air and/or gas and/or steam upon parts of electrodes, and/or sharp bends of the said current having high velocity and/or any undue departure of the said current from the surface of the parts of electrodes along which the said current is moving with high velocity and/or immediate changing, particularly increasing the cross section of the said current.

Since in accordance with our invention the ignition of the auxiliary arc may take place between the main electrode and the screen electrode of the one electrode, the distance between the said parts of electrodes may be rather narrow for ensuring a regular establishment of the auxiliary arc with certainty. Any difficulty arising from the said narrow duct may be overcome by channels 47 radially inserted into the surface of the screen electrode 24 and/or main electrode, the said surface opposing the adjoining part of the electrode. By this means the area of the cross-section of the duct between the screen electrode and the main electrode is efficaciously increased, the distance of the opposing points between which the auxiliary arc is to be initiated remaining still small. The foot point of the auxiliary arc then is established upon the section remaining between two channels. The formation of eddies, the impingement of the current of air and/or gas and/or steam or any other troubles inflicted upon the said current may also be prevented by additional introduction or discharge of parts of currents of air and/or gas and/or steam.

Figure 3:
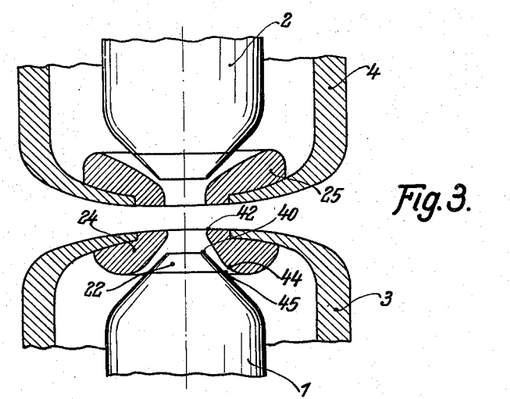

A voltage is applied to the auxiliary electrode 3 and the main electrode 1, which are separated from each other by the cylinder 5 or insulating material. When the said voltage has risen to a sufficient magnitude flash-over will occur between the nearest opposite points upon the auxiliary electrode and main electrode and an auxiliary arc follows this flash-over. The gas current flowing through the narrow duct 43 between the auxiliary electrode and the main electrode and, gaining a considerably high velocity because of the reduced cross-section, will drive the auxiliary arc forming a loop to the opposite main electrode. The one foot point of auxiliary arc arisen already upon the portion of the main electrode upon which one of the foot points of the main arc shall exist may remain there near the point marked as 40 or, if the ignition may occur lower down between the points 44, 45 as shown in Fig. 3, the said footpoints may travel to a point near 40. The other footpoint of the auxiliary arc established upon the auxiliary electrode at 41, as Fig. 1 shows, or at 44 as Fig. 3 shows, travels quickly to point 42 and finally jumps to the opposite main electrode thus forming a conductive path for initiating the main arc.

It will be of advantage to establish the footpoint of the auxiliary arc upon such points of the surface of the main electrode, that the foot point of the main arc may be able to start travelling.

Since it may be provided for that the auxiliary arc driven to the opposite electrode may make contact with the main electrode, the foot points of the main arc remain already from the beginning of the firing period upon parts of electrodes which are electrically screened, see 59 and 60 of Fig. 1.

For this purpose and/or in order to make the foot points of the arc travel along any desirable path, portions of electrodes covered with insulating material, e. g., non-conductive metal oxides may be employed, which will not carry the arc.

Furthermore the foot points of the arc may be caused by suitable means to travel upon an area of the surface, the diameter of the said area being greater than that of the aperture of the screen electrode, whereby the area of the surface exposed to burning-off will be considerably large and the amount of burning-off reduced.

Special means must be provided for ensuring regularly initiating the auxiliary arc and/or the main arc. For instance a pronounced sharp edged, crater-like rim 40 upon the main electrode opposing the screen electrode may facilitate the igniting of the auxiliary arc. The use of the crater 66 as shown in Fig. 2—in Fig. 4 a crater 48 after long time service is shown—furnishes the further advantage that the footpoint of the arc burning within the said crater is protected against the gas blast of high velocity, streaming between the main electrode and the adjoining screen electrode.

The said crater may consist of a metal of low melting point and/or low conductivity and/or may be filled wholly or partially with mercury.

The said sharply edged rim of the crater may consist advantageously of a metal of higher melting temperature than the crater.

Furthermore, for the deposition of burnt particles carried along by the arc and/or by the current of air and/or gas and/or steam flowing through the arc gap a recess 63 may be provided, if any troubles because of the said burnt particles may arise.

In a converting arrangement according to the preceding and still following description it does not matter in which direction the current flows, which matter of fact has been proved by thorough tests. Many cases, however, following distribution of polarity, may give more satisfactory working conditions. The ignition electrode, e. g., the screen electrode upon which the auxiliary arc is to be established is of positive polarity against the adjoining main electrode, upon which in this case the cathode foot point of the main arc is established. The foot point of the auxiliary arc initiated upon the ignition electrode represents the anode and, therefore, will jump more easily to the second main electrode upon which then the anode foot point of the main arc is established.

During the burning period the main arc extending between the two main electrodes is enveloped by the gas blast in order to avoid undue lengthening of the main arc, with the consequent high losses and great heating of the gas current and the electrodes and to transport away the heat produced by the arc. The velocity of the current of air and/or gas and/or steam forming a hollow cylinder as already described, will be less at the inner parts of the cylinder and/or at parts which are in the vicinity of the main arc than at the outside parts of the said hollow cylinder. This distribution of velocity across the cross section of the gas current may also be effected by the heat produced by the arc.

After the current of the main arc has passed through zero the gas blast assures the thorough cleansing of the space between the electrodes from the residual arc products in order to prevent re-establishment of the arc between the electrodes.

In some cases it may occur, that the gas jet leaving the opening 65 of the screen electrode 24 may diverge a little, and impinge upon the screen electrode of the confronting electrode. This will be overcome by the current of air and/or gas and/or steam introduced into the distribution chamber 20 through the duct 15, flowing through the holes 62 along the outer wall of the cylindrical body 4, and entering the arc gap between the two screens electrodes. The said current will compress the arc and/or the axial gas flow particularly in the front the screen electrode 25, effecting a uniform flow of air and/or gas and/or steam passing the air gap and leaving it through the aperture 55 of the screen electrode 25.

In some cases it may prove of advantage to effect a spiral-like movement of the said currents of air and/or gas and/or steam.

It will be obvious to those skilled in the art that the said radially inward gas flow may be introduced into the arc gap from any part provided for in the arrangement, e. g., through special holes or annular openings provided for in one or both of the screen electrodes without departing from our invention.

The gas current leaving the arc space through the opening 55 of the screen electrode flows through the narrow duct 56 between the main electrode and the screen electrode into the counter compression room 57 from which it enters the recollection chamber 21 through the opening 63, where the velocity of the current will be reduced and the current diminished before leaving the converter chamber through the duct 16.

By means of the threads 13, the position of the main electrode may be adjusted longitudinally with respect to the screen electrode.

While we have shown and described several embodiments of our invention, it will be obvious to those skilled in the art that various changes and modifications may be made without departing from our invention in its broader aspects and, we, therefore, aim in the appended claims to cover all such changes and modifications as fall within the true spirit and scope of our invention.

What we claim as new and desire to secure by Letters Patent of the United States is:

1. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, and means including parts of electrodes between which the auxiliary arc is struck periodically whereby at least one of the foot points of the auxiliary arc arises in the vicinity of that point where one of the foot points of the main arc which is to be initiated shall exist.

2. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, and means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means including parts of electrodes having such a form, e. g., such holes as to make the whole or partial current of air and/or gas and/or steam move along the main arc and envelope the said main arc on its entire length whereby the said main arc is caused to burn between the main electrodes without any undue lengthening.

3. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means for diminishing the velocity of the current of air and/or gas and/or steam, streaming along the main arc and/or enveloping the main arc at the inner parts of the cross section of the said current which are in the vicinity of the main arc.

4. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means for causing the main arc to effect the diminishing of the velocity of the current of air and/or gas and/or steam streaming along the main arc at the inner parts of the cross section of the said current which are in the vicinity of the main arc by the heat produced in the main arc.

5. The arrangement of arc gaps, e. g., arc converters, arc rectifiers, and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means for introducing into the arc gap a current of air and/or gas and/or steam of annular cross section and means for discharging a current of air and/or gas and/or steam of annular cross section whereby the said current of air and/or gas and/or steam forms a hollow cylinder of constant or varying diameter.

6. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means for establishing the foot points of the main arc upon portions of the electrodes which are located within the hollow cylinder formed by the flow of air and/or gas and/or steam and means for keeping the main arc within the said hollow cylinder formed by the flow of air and/or gas and/or steam from starting until quenching of the arc.

7. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes suitably shaped, between which the gas is to pass, for diminishing the velocity of the current of air and/or gas and/or steam on its passageway to and from the arc gap whereby the velocity of the said current is not greater on its passageway to and from the arc gap than on its passageway through the arc gap.

8. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means for introducing into the arc gap a second current of air and/or gas and/or steam adapted to compress the jet of air and/or gas and/or steam entering the arc gap through the central aperture of the one screen electrode and adapted to avoid undue expansion of the main arc because of the heat produced by the said arc.

9. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second and/or gas and/or steam through the second electrode between the main electrode and screen electrode, means including parts of electrodes suitably shaped, along which and/or between which the current of air and/or gas and/or steam is guided with high velocity, for obviating the danger of impingement of the said current and/or the danger of formation of eddies because of sharp bends of the said current and/or immediate alteration of the cross section on the passageway of the said current from the point where the said current enters the annular duct leading to the arc gap to the point where the said current leaves the annular duct leading away from the arc gap.

10. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes having additional apertures for introducing and discharging parts of the current of air and/or gas and/or steam for avoiding impingement and/or the formation of eddies of the current of air and/or gas and/or steam on those parts of the passageway where the said current attains a high velocity.

11. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means for effecting a spiral-like movement of the axial flow of air and/or gas and/or steam and/or of the radial flow of air and/or gas and/or steam.

12. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arc by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes suitably shaped for obviating the danger of disturbing the converting service by the deposition of burnt particles carried along by the arc and/or by the current of air and/or gas and/or steam, means including a central recess being in said main electrodes into which the said burnt particles are caused to settle.

13. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, and means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means for driving the loop of the auxiliary arc, formed between the main electrode and the screen electrode of one electrode, to the opposed main electrode whereby the one footpoint of auxiliary arc remains upon the main electrode whilst the other foot point of the auxiliary arc, which arises upon the screen electrode, is travelling along the surface of the said screen electrode through the aperture of the said screen electrode and finally jumps to the opposed main electrode.

14. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means for striking the auxiliary arc on points of the main electrode from which the foot point of the main arc is able to start travelling upon the main electrode.

15. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means for striking the auxiliary arc on such points of the main electrode that the surface of the main electrode exposed to burning-away due to the travelling foot point of the main arc has a greater diameter than the aperture of the screen electrode.

16. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means for initiating one or both foot points of the main arc upon portions of electrodes which are electrically screened.

17. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means including parts of electrodes consisting of insulating material or covered with insulating material, e. g., non-conductive oxide for influencing the electric field conditions.

18. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means including parts of electrodes suitably shaped between which the auxiliary arc is formed for causing a slow movement of the foot point arisen upon the main electrode and for causing the foot point arisen upon the screen electrode to travel fast to the upper rim of the said screen electrode, whereby the said foot point arisen upon the main electrode burns upon portions of the said main electrode which are not exposed to parts of the current of air and/or gas and/or steam which are of high velocity.

19. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, the said parts of electrodes having their opposing surfaces suitably shaped for facilitating the ignition of the auxiliary arc between the said parts of electrodes whereby due to the burning-away upon the main electrode a sharply edged crater is formed and/or is retained.

20. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, the said parts of electrodes having their opposing surfaces suitably shaped for forming a sharply edged crater upon the main electrode due to the burning-away whereby the foot point of the main arc upon the said main electrode is retained within the said crater without being disturbed by the current of air and/or gas and/or steam flowing between the said parts of electrodes.

21. The arrangement of arc gaps, e. g., arc converters, arc rectifiers, and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, one of the said parts of electrodes, e. g., the screen electrode having radial channels inserted into the surface opposing the adjoining part of electrode for blowing a large flow of air and/or gas and/or steam between the said parts of electrodes without reducing the distance between points upon the said parts of electrodes where the ignition of the auxiliary arc is to take place.

22. The arrangement of arc gaps, e. g., arc converters, arc rectifiers, and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, and means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, the said parts of electrodes having their opposing surfaces suitably shaped for forming a sharply edged crater upon the main electrode due to the burning-away thereof, the portion of the main electrode upon which the said crater is formed consisting of a material of a lower melting point and/or of lower conductivity.

23. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, the said parts of electrodes having their opposing surfaces suitably shaped for forming a sharply edged crater upon the main electrode due to the burning-away thereof, the said crater being filled entirely or partly with mercury.

24. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, the said parts of electrodes having their opposing surfaces suitably shaped for forming a sharply edged crater upon the main electrode due to the burning-away thereof, the sharply edged rim of the said crater consisting of a material of higher melting point.

25. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, the said parts of electrodes having their opposing surfaces suitably shaped for forming a sharply edged crater upon the main electrode due to the burning-away thereof, the said portion of electrode upon which the crater is formed consisting of a piece of metal automatically shifted forward, e. g., by a spring.

26. The arrangement of arc gaps, e. g., arc converters, arc rectifiers and arc inverters comprising two electrodes in a flow of air and/or gas and/or steam, either electrode consisting at least of a main-electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means for forming the cathode foot points of the auxiliary arc upon parts of electrodes upon which the cathode foot point of the main arc is to exist.

27. The arrangement of arc gaps, e. g., arc converters, arc rectifiers and arc inverters comprising two electrodes in a flow of air and/or gas and/or steam, either electrode consisting at least of a main electrode and a screen electrode and with means for a periodic initiating of the main arcs by auxiliary arcs, means for introducing a stream of air and/or gas and/or steam into the arc chamber through one electrode between the main electrode and screen electrode, whereby additional openings for a further stream may be provided, means for discharging the air and/or gas and/or steam through the second electrode between the main electrode and screen electrode, means including parts of electrodes between which the auxiliary arc is struck periodically whereby at least one of the foot points of the auxiliary arc arises on portions of electrodes or in the vicinity of portions of electrodes upon which one of the foot points of the main arc which is to be initiated shall exist, means for making the cathode foot point of the main arc arise upon the main electrode.

ERWIN MARX.
HERBERT BUCHWALD.